(12) United States Patent
Fuse

(10) Patent No.: US 8,910,366 B2
(45) Date of Patent: Dec. 16, 2014

(54) PRESS-FITTING METHOD OF MEMBER AND PRESS-FITTING APPARATUS

(75) Inventor: Masaru Fuse, Kashihara (JP)

(73) Assignee: JTEKT Corporation, Osaka-shi, Osaka (JP)

( * ) Notice: Subject to any disclaimer, the term of this patent is extended or adjusted under 35 U.S.C. 154(b) by 225 days.

(21) Appl. No.: 12/735,210

(22) PCT Filed: Dec. 24, 2008

(86) PCT No.: PCT/JP2008/073466
§ 371 (c)(1),
(2), (4) Date: Jun. 22, 2010

(87) PCT Pub. No.: WO2009/081948
PCT Pub. Date: Jul. 2, 2009

(65) Prior Publication Data
US 2010/0275434 A1   Nov. 4, 2010

(30) Foreign Application Priority Data

Dec. 25, 2007   (JP) .............................. P2007-331689

(51) Int. Cl.
B23P 19/02   (2006.01)
B25B 27/02   (2006.01)
B21L 9/06   (2006.01)

(52) U.S. Cl.
CPC ................. B25B 27/02 (2013.01); B23P 19/02 (2013.01); B21L 9/065 (2013.01)
USPC ........... 29/525; 29/281.1; 29/281.6; 29/283.5

(58) Field of Classification Search
CPC .......... B21L 9/065; B23P 19/02; B25B 27/02
USPC .......... 29/281.1, 281.6, 283.5, 464, 525, 559, 29/244
See application file for complete search history.

(56) References Cited

U.S. PATENT DOCUMENTS 4,771,535 A * 9/1988 Abe et al. ......................... 29/802
5,699,600 A * 12/1997 Choi ............................... 29/251
(Continued)

FOREIGN PATENT DOCUMENTS

JP   2001-353628 A   12/2001
JP   2003-127032   5/2003
(Continued)

OTHER PUBLICATIONS

Notification of Reasons for Refusal dated Jul. 31, 2012, with English translation.

(Continued)

*Primary Examiner* — Peter DungBa Vo
*Assistant Examiner* — Kaying Kue
(74) *Attorney, Agent, or Firm* — McGinn IP Law Group, PLLC

(57) ABSTRACT

The invention provides a press-fitting method of a member and a press-fitting apparatus in which press-fitting errors can be reduced, without using a dummy pin.

The pressing jig 45 includes a main body 46 having a guide pin containing part 47 which is open downward, a compression coil spring (a resilient member) 48 which is contained in an upper part of the guide pin containing part 47, a guide pin 49 which is contained in a lower part of the guide pin containing part 47 with its lower end portion projected downward from a lower face of the main body 46 by an urging force of the compression coil spring 48, and a permanent magnet 50 in an annular shape which is fixed to the lower face of the main body 46, as attracting and holding unit for attracting and holding the press-fitting member 11.

17 Claims, 2 Drawing Sheets

(56) References Cited

U.S. PATENT DOCUMENTS

| | | | |
|---|---|---|---|
| 5,761,794 A * | 6/1998 | Choi | 29/732 |
| 7,140,173 B2 * | 11/2006 | Van Rooij | 59/7 |
| 7,617,668 B2 * | 11/2009 | Miura | 59/8 |
| 7,846,050 B2 * | 12/2010 | Miura | 474/245 |
| 7,882,689 B2 * | 2/2011 | Tada et al. | 59/35.1 |
| 8,100,794 B2 * | 1/2012 | Kamamoto et al. | 474/157 |
| 8,182,384 B2 * | 5/2012 | Yasuhara | 474/226 |
| 2005/0050723 A1 * | 3/2005 | Hauser et al. | 29/732 |
| 2007/0265125 A1 | 11/2007 | Fuse | |
| 2008/0184692 A1 * | 8/2008 | Miura | 59/35.1 |
| 2009/0105026 A1 * | 4/2009 | Kamamoto et al. | 474/245 |
| 2011/0016843 A1 * | 1/2011 | Scott | 59/7 |

FOREIGN PATENT DOCUMENTS

| | | | | |
|---|---|---|---|---|
| JP | 2004139650 A * | 5/2004 | | G11B 19/20 |
| JP | 2006-116563 | 5/2006 | | |
| WO | WO 2006/004084 A1 | 1/2006 | | |
| WO | WO 2006-004084 A1 | 1/2006 | | |

OTHER PUBLICATIONS

Japanese Notification of Reasons for Refusal dated Apr. 1, 2013.
Chinese Office Action dated Jan. 9, 2012, with English translation.

* cited by examiner

PRESS-FITTING METHOD OF MEMBER AND PRESS-FITTING APPARATUS

TECHNICAL FIELD

The present invention relates to a press-fitting method of a member and a press-fitting apparatus which are used when a link (a press-fitting member in a plate-like shape) is press-fitted onto a pin (a member in a rod-like shape to be press-fitted), in assembling, for example, a power transmission chain including the links and pins.

BACKGROUND ART

As a power transmission chain, there has been known a structure including a plurality of links which are arranged in a lateral direction of the chain, and a plurality of pins for interconnecting the links which are respectively inserted into the links to be fixed thereto by press-fitting. As a manufacturing method for this power transmission chain, it has been known that a required number of the pins are uprightly arranged and held in a state of arrangement where they have been assembled as the chain, and thereafter, the links are sequentially press-fitted onto these pins, one by one, from a lower end side thereof.

In this conventional press-fitting method, press-fitting errors sometimes occur due to a relative displacement between the pin and the link, and it has been a problem to reduce the press-fitting errors, by enhancing allowance of the relative displacement. In order to solve this problem, it has been proposed in Patent Document 1 to use a dummy pin.
Patent Document 1: Japanese Patent Publication No. JP-A-2006-116563

DISCLOSURE OF THE INVENTION

Problems that the Invention is to Solve

According to the press-fitting method of the power transmission chain in the above described Patent Document 1, although the relative displacement between the pin and the link has been prevented, it has been necessary to newly add a step for inserting the dummy pin, and there has been a problem that the number of the steps is increased.

An object of the invention is to provide a press-fitting method of a member and a press-fitting apparatus in which press-fitting errors can be reduced, without using a dummy pin.

Means for Solving the Problems

According to this invention, there is provided a press-fitting method of a member in which a rod-like member to be press-fitted is held by a holding jig, while a plate-like press-fitting member having an insertion hole is held by a pressing jig, and the pressing jig is moved thereby to sequentially push the press-fitting member up to a determined position of the member to be press-fitted, characterized in that the member to be press-fitted is provided with a chamfered part at an end thereof, the press-fitting member is attracted and held by the pressing jig so as to move in a direction perpendicular to a moving direction of the pressing jig, and, the pressing jig is moved, after the insertion hole of the press-fitting member has been aligned with the chamfered part of the member to be press-fitted.

According to the invention, there is further provided a press-fitting apparatus comprising a holding jig for holding a rod-like member to be press-fitted, and a pressing jig for holding a plate-like press-fitting member having an insertion hole and for pushing the press-fitting member up to a determined position of the member to be press-fitted, characterized in that the pressing jig includes a main body having a guide pin containing part, a resilient member which is contained in the guide pin containing part, a guide pin which is contained in the guide pin containing part with its one end portion projected from the main body by an urging force of the resilient member, and attracting and holding means for attracting and holding the press-fitting member so as to move in a direction perpendicular to an axis of the guide pin.

Usually, the member to be press-fitted is uprightly held, and movement of the pressing jig can be conducted by using a pressing machine, for example. The holding jig and the main body of the pressing jig are produced employing carbon jig steel or alloy jig steel.

A mechanism of the pressing jig for attracting and holding the press-fitting member may be such that it can prevent the press-fitting member from falling, and can move in a direction perpendicular to the moving direction of the pressing jig. In some cases, the press-fitting member may be attracted by vacuum, or may be attracted by magnetic attraction, in case where the press-fitting member is formed of magnetic substance (for example, steel).

The press-fitting work can be carried out by arranging a determined number of the members to be press-fitted on the holding jig, then, by rendering the pressing jig to attract and hold the press-fitting member, and thereafter, by moving the pressing jig up to the determined position.

In the conventional case where the press-fitting member has been unable to move, when a relative displacement has occurred between the press-fitting member held by the pressing jig and the member to be press-fitted, a press-fitting error due to interference between the press-fitting member and the member to be press-fitted has occurred in some cases, by moving the pressing jig. By contrast, according to the press-fitting method and the press-fitting apparatus of the invention, when a relative displacement has occurred between the press-fitting member which is held by the pressing jig and the member to be press-fitted, it is possible to move the press-fitting member in a direction of eliminating the relative displacement along with the movement of the pressing jig, because the press-fitting member is attracted and held so as to move in the direction perpendicular to the moving direction of the pressing jig. In this manner, the press-fitting errors can be reduced.

By providing the chamfered part at the end of the member to be press-fitted, a work for fitting the insertion hole of the press-fitting member to the end of the member to be press-fitted can be facilitated. At the same time, the relative displacement between the press-fitting member and the member to be press-fitted is absorbed, and thereafter, the edge part of the insertion hole is guided by the chamfered part, whereby the press-fitting member is properly positioned with respect to the member to be press-fitted.

Moreover, the guide pin is provided in the pressing jig and adapted to be pushed into the guide pin containing part, when it has come into contact with the member to be press-fitted, whereby positioning accuracy can be further enhanced.

The press-fitting method and press-fitting apparatus as described above are suitable for manufacturing a power transmission chain which includes a plurality of links (corresponding to the plate-like press-fitting members), and a plurality of first pins and a plurality of second pins (corresponding to the rod-like members to be press-fitted) arranged in a longitudinal direction for interconnecting the links which are arranged in the lateral direction of the chain so that a front insertion hole of one of the links may be opposed to a rear insertion hole of the other link. When the first pins and the second pins are relatively moved in rolling contact, the links can be flexed in the longitudinal direction of the chain, whereby one of the first pin and the second pin is fixed by press-fitting to the front insertion hole of the one link, and at the same time, movably fitted into the rear insertion hole of the other link, while the other of the first pin and the second pin is movably fitted into the front insertion hole of the one link, and at the same time, fixed by press-fitting to the rear insertion hole of the other link.

In the above described power transmission chain, at least one of the first pin and the second pin comes into contact with a pulley thereby to transmit the power by a frictional force. In the chain of such a type that either one of the pins comes into contact with the pulley, either one of the first pin and the second pin is used as the pin which comes into contact with the pulley, and the other is used as the pin which does not come into contact with the pulley, in case where this chain is used in a continuously variable transmission. The links are formed of, for example, spring steel, carbon jig steel, bearing steel, and so on, and the pins are formed of appropriate steel such as bearing steel.

Advantage of the Invention

According to the press-fitting method of a member and the press-fitting apparatus of the invention, when a relative displacement has occurred between the press-fitting member which is held by the pressing jig and the member to be press-fitted, it is possible to move the press-fitting member in a direction of eliminating the relative displacement along with the movement of the pressing jig, because the press-fitting member is attracted and held so as to move in the direction perpendicular to the moving direction of the pressing jig, and hence, the press-fitting errors can be reduced.

BEST MODE FOR CARRYING OUT THE INVENTION

Figure 1:
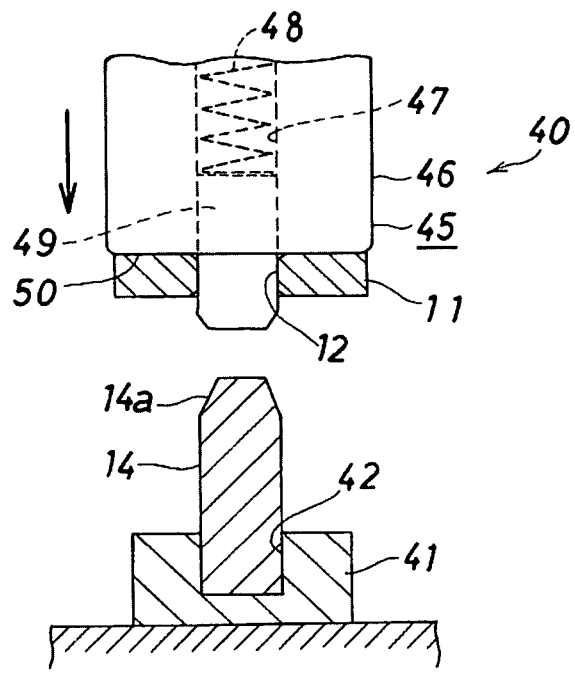
FIG. 1 is a vertical sectional view of a press-fitting apparatus according to the invention.

Now, an embodiment of the invention will be described referring to the drawings. In the following description, "upside and downside" correspond to an upside and a downside in FIGS. 1 and 2.

Figure 3:
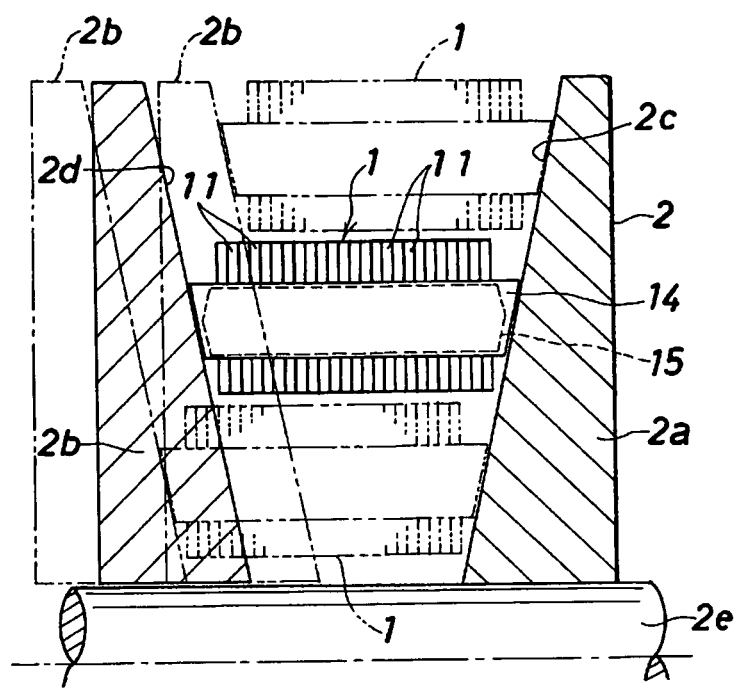
FIG. 3 is a plan view showing a part of an embodiment of a power transmission chain, which is an example of a product manufactured by using the press-fitting method of a member and the press-fitting apparatus according to the invention.

FIG. 3 is a plan view showing a part of a power transmission chain, which is an example of a product manufactured by using the press-fitting method and the press-fitting apparatus according to the invention. A power transmission chain 1 includes a plurality of links 11 each having through holes 12, 13 which are provided at a determined interval in a longitudinal direction of the chain, and a plurality of first pins 14 and second pins 15 for interconnecting the links 11 which are arranged in a lateral direction of the chain, in such a manner that the links can be flexed in the longitudinal direction of the chain. The second pin 15 is made shorter than the first pin 14. Both the pins are opposed to each other in such a manner that the second pin 15 is arranged at a front side and the first pin 14 is arranged at a back side.

In order to manufacture this power transmission chain 1, it is necessary to sequentially press-fitting the links 11 (formed of magnetic substance) onto the pins 14, 15 up to a determined position in the lateral direction of the chain, after a required number of the pins 14, 15 have been arranged at a determined pitch and held in a state of arrangement where they have been assembled as the chain 1. For this purpose, a press-fitting apparatus 40 for holding the rod-like members to be press-fitted (that is, the pins 14, 15) by a holding jig 41, and at the same time, for sequentially press-fitting the press-fitting members (that is, the links 11) by a pressing jig 45 is used.

Figure 2:
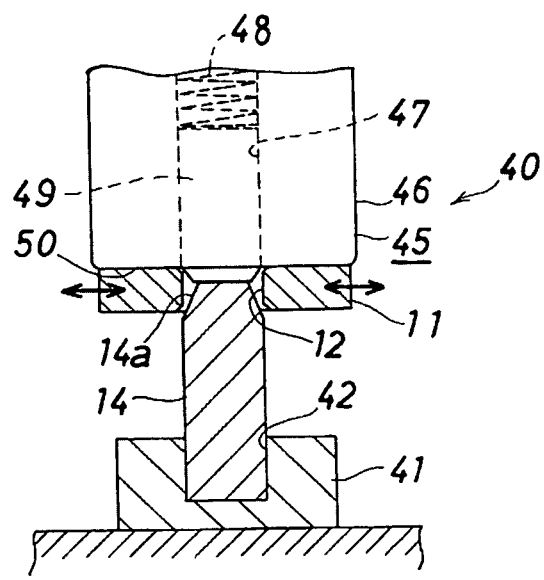
FIG. 2 is a vertical sectional view of the press-fitting apparatus according to the invention, showing a state in the middle of press-fitting.

The press-fitting method and the press-fitting apparatus according to the invention are favorably used, for example, in manufacturing the above described chain 1. As shown in FIGS. 1 and 2, the press-fitting apparatus 40 includes the holding jig 41 in a disc-like shape having a required number of insertion holes 42 into which lower end portions of the rod-like members 14 to be press-fitted can be inserted, and the pressing jig 45 which attracts and holds the press-fitting member 11, and is moved up and down by a pressing machine (not shown) thereby to push the press-fitting member 11 up to a determined position of the member 14 to be press-fitted.

The holding jig 41 is held so as to rotate around a vertical axis. Each of the insertion holes 42 in the holding jig 41 is a bottomed hole, into which the lower end portion of the member 14 to be press-fitted is fitted. A cross sectional shape of the insertion hole 42 is substantially the same as that of the insertion hole 12, 13 of the press-fitting member 11, and a clearance to some extent is provided so that the member 14 to be press-fitted can be easily inserted and extracted.

The pressing jig 45 is a jig for press-fitting the press-fitting members 11 one by one, and includes a main body 46 having a guide pin containing part 47 which is open downward, a compression coil spring (a resilient member) 48 which is contained in an upper part of the guide pin containing part 47, a guide pin 49 which is contained in a lower part of the guide pin containing part 47 with its lower end portion projected downward from a lower face of the main body 46 by an urging force of the compression coil spring 48, and a permanent magnet 50 in an annular shape which is fixed to the lower face of the main body 46, as attracting and holding means for attracting and holding the press-fitting member 11.

A cross sectional shape of the guide pin containing part 47 is made slightly larger than a cross sectional shape of the member 14 to be press-fitted so that the member 14 to be press-fitted can be inserted therein.

The compression coil spring 48 has its upper end portion fixed to an upper face of the guide pin containing part 47, and has its lower end portion fixed to an upper face of the guide pin 49.

In a state where the guide pin 49 is suspended from the compression coil spring 48 with its lower end portion projected from the lower face of the main body 46, deadweight of the guide pin 49 is in proportion with a resilient force of the compression coil spring 48.

The permanent magnet 50 has a holding face on its lower face which is formed as a flat plane, and holds the press-fitting member 11 formed of magnetic substance on the holding face, by attracting it by magnetic attraction. Because the holding face is flat, the press-fitting member 11 can move in a horizontal direction (a direction perpendicular to an axis of the guide pin 49). It is to be noted that the holding face may be in such a shape that the holding force can be transmitted to the press-fitting member 11 without restricting the movement of the press-fitting member 11 in the horizontal direction. Besides the flat face for attracting and holding the entire contact face of the press-fitting member 11, it is also possible to form a convex part which is adapted to partially come into contact with the press-fitting member 11 thereby to attract and hold the press-fitting member 11.

Although the permanent magnet 50 has been adopted as the attracting and holding means in this embodiment, an electromagnet having a holding face, vacuum attraction and so on may be adopted as other attracting and holding means which do not restrict the movement of the press-fitting member 11 in the horizontal direction.

In the press-fitting work using this press-fitting apparatus 40, as a first step, a determined number of the members 14 to be press-fitted each provided with a chamfered part 14a at its end, as shown in FIG. 1, are arranged on the holding jig 41, and at the same time, the press-fitting members 11 having the insertion holes 12 are attracted and held by the pressing jig 45. Thereafter, the pressing jig 45 is moved downward.

As the pressing jig 45 is moved downward, the lower end face of the guide pin 49 is brought into contact with the upper end face of the member 14 as a first step. By further moving the pressing member 45 downward, the guide pin 49 is pushed into the guide pin containing part 47 by the upper end face of the member 14. By further moving the pressing member 45 downward, an entirety of the guide pin 49 is pushed into the guide pin containing part 47, while the end portion of the member 14 to be press-fitted enters into an interior of the insertion hole 12 of the press-fitting member 11. This state (a state in the middle of the press-fitting) is shown in FIG. 2. Because the chamfered part 14a is provided at the end of the member 14 to be press-fitted, a region provided with the chamfered part 14a proceeds to enter into the interior of the insertion hole 12 of the press-fitting member 11, without interfering with a peripheral edge of the insertion hole 12 of the press-fitting member 11, even in case where there is a relative displacement between the press-fitting member 11 which is held by the pressing jig 45 and the member 14 to be press-fitted. A region of the member 14 to be press-fitted which is not provided with the chamfered part 14a may interfere with the peripheral edge of the insertion hole 12 of the press-fitting member 11. However, because the press-fitting member 11 can move in the horizontal direction, an inner peripheral face of the insertion hole 12 of the press-fitting member 11 is guided by the region provided with the chamfered part 14a in the member 14 to be press-fitted, and the press-fitting member 11 is moved to a proper position. Thereafter, the pressing jig 45 is further moved downward, whereby a proper press-fitting work is carried out.

The press-fitting method and the press-fitting apparatus 40 as described above can be applied to the various power transmission chains 1 of a press-fitting type, irrespective of the shapes of the link 11 and pins 14, 15. Moreover, the press-fitting method and the press-fitting apparatus 40 can be used not only in the power transmission chain 1, but also in other apparatuses in which a plate-like press-fitting member having an insertion hole is press-fitted onto a rod-like member to be press-fitted.

The invention claimed is:

1. A press-fitting method comprising:
    holding a lower end portion of a rod member to be press-fitted with a holding jig; and
    while holding a link member including an insertion hole with a pressing jig, moving the pressing jig downward to sequentially push the link member to a determined position of the rod member,
    wherein the pressing jig includes:
        a main body having a guide pin containing part which is open downward;
        a resilient member which is contained in an upper part of the guide pin containing part;
        a guide pin which is contained in a lower part of the guide pin containing part with a lower end portion thereof projected from the main body by an urging force of the resilient member; and
        an attracting and holding unit configured so as to attract and hold the link member so as to move in a direction perpendicular to an axis of the guide pin,
    wherein the rod member includes a chamfered part at an end thereof,
    wherein the link member is attracted and held by the pressing jig,
    wherein the moving the pressing jig is performed after the insertion hole of the link member has been aligned with the chamfered part of the rod member,
    wherein, in a process of the moving the pressing jig downward, the lower end portion of the guide pin is brought into contact with an upper end face of the rod member and then, the guide pin is pushed into the guide pin containing part by the upper end face of the rod member, and, when only a chamfered part of the guide pin and the chamfered part of the rod member are entered into the insertion hole of the link member, the link member can move in the direction perpendicular to the axis of the guide pin, and
    wherein the holding the link member further includes holding the link member on, and in a direct contact with, a magnetized surface.

2. A press-fitting method as claimed in claim 1, wherein said link member is moved in a pressing direction of said pressing jig, while an inner peripheral face of said insertion hole is guided by said chamfered part of the rod member, whereby said pressing jig is moved, after the insertion hole has been aligned with the chamfered part.

3. A press-fitting method as claimed in claim 1, wherein said pressing jig attracts and holds said link member by a magnetic attraction.

4. A press-fitting apparatus comprising:
    a holding jig configured so as to hold a lower end portion of a rod member to be press-fitted; and
    a pressing jig configured so as to move downward while holding a link member having an insertion hole, to push the link member to a determined position of the rod member, the pressing jig including:
        a main body having a guide pin containing part which is open downward;
        a resilient member which is contained in an upper part of the guide pin containing part;
        a guide pin which is contained in a lower part of the guide pin containing part with a lower end portion thereof projected from the main body by an urging force of the resilient member; and
        an attracting and holding unit configured so as to attract and hold the link member on, and in a direct contact with, a holding face of a magnet by magnetic force so as to move in a direction perpendicular to an axis of the guide pin,
    wherein the guide pin, as the pressing jig is moved downward, is brought into contact with an upper end face of the rod member and is pushed into the guide pin containing part, and, when only a chamfered part of the guide pin and a chamfered part of the rod member are entered into the insertion hole of the link member, the link member can move in the direction perpendicular to the axis of the guide pin.

5. A press-fitting apparatus as claimed in claim 4, wherein said attracting and holding unit includes said magnet, said magnet comprising a permanent magnet said attracting and holding unit holding said link member on said holding face by attracting it by said magnetic force, said magnetic force comprising a magnetic attraction.

6. A press-fitting method as claimed in claim 1, wherein the rod member is held such that the rod member contacts the holding jig.

7. A press-fitting method as claimed in claim 1, wherein the link member comprises a chain link.

8. A press-fitting method as claimed in claim 1, wherein the rod member comprises a pin.

9. A press-fitting method as claimed in claim 1, further comprising inserting the rod member in an insertion hole of a second link member.

10. A press-fitting method as claimed in claim 1, further comprising inserting an other rod member in the insertion hole, the other rod member being in rolling/sliding contact with the rod member.

11. A press-fitting apparatus as claimed in claim 4, wherein the holding jig is configured so as to contact the rod member.

12. A press-fitting apparatus as claimed in claim 4, wherein the rod member comprises a pin, and
wherein the holding jig is configured so as to contact the pin.

13. A press-fitting apparatus as claimed in claim 4, wherein said attracting and holding unit includes said magnet and holds said link member on said holding face by attracting it by said magnetic force, said magnetic force comprising a magnetic attraction.

14. A press-fitting apparatus as claimed in claim 4, wherein the attracting and holding unit includes an attraction force generating member which attracts the link, and
wherein the attraction generating member is configured so as to contact the link member.

15. A press-fitting apparatus as claimed in claim 4, wherein the attracting and holding unit includes said magnet, and
wherein the magnet is configured so as to contact the link member when the link member is held by the attracting and holding unit.

16. A press-fitting method as claimed in claim 1, wherein the link member comprises a link of a power transmission chain.

17. A press-fitting method as claimed in claim 1, wherein the holding face comprises a flat holding face.

* * * * *